(12) United States Patent  
Barcus

(10) Patent No.: US 6,202,483 B1  
(45) Date of Patent: *Mar. 20, 2001

(54) VOLUMETRIC FLOW METERING APPARATUS

(76) Inventor: Richard D. Barcus, 17900 Hwy. 238, Grants Pass, OR (US) 97527

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/073,014

(22) Filed: May 5, 1998

Related U.S. Application Data

(60) Provisional application No. 60/046,844, filed on May 5, 1997.

(51) Int. Cl.$^7$ .............. G01F 3/24; G01F 23/00; B67D 5/08
(52) U.S. Cl. ............. 73/224; 73/304 R; 222/639
(58) Field of Search ............. 73/224, 223, 290 R, 73/304 R, 304 C; 222/14, 16, 36, 639, 644

(56) References Cited

U.S. PATENT DOCUMENTS

| | | | |
|---|---|---|---|
| 2,966,798 | * | 1/1961 | Smith .................... 73/224 |
| 3,122,920 | * | 3/1964 | Murphy et al. ......... 73/224 |
| 3,350,937 | * | 11/1967 | Brewer .................. 73/224 |
| 4,253,332 | * | 3/1981 | Sabaatino et al. ..... 73/224 |
| 4,306,454 | * | 12/1981 | Orlik et al. ............ 73/224 |
| 5,016,790 | * | 5/1991 | Thomas et al. ....... 222/639 |
| 5,564,305 | * | 10/1996 | Cadeo .................. 73/304 R |
| 5,901,740 | * | 5/1999 | Sanchelima .......... 73/304 R |

* cited by examiner

*Primary Examiner*—Harshad Patel
(74) *Attorney, Agent, or Firm*—Steven J. Adamson

(57) ABSTRACT

A volumetric flow meter that includes a defined volume and sensors that detect when liquid begins to fill the defined volume and when that volume is full. A circuit or equivalent logic is preferably provided to generate a signal representative of flow rate based on the size of the defined volume and time required to fill that volume. The flow meter is constructed of economical and durable components. A method of flow metering is also disclosed.

8 Claims, 3 Drawing Sheets

VOLUMETRIC FLOW METERING APPARATUS

RELATED APPLICATION

This application claims the benefit of U.S. Provisional Application No. 60/046,844, filed May 5, 1997, and having the same title and inventor as above.

FIELD OF THE INVENTION

The present invention relates to flow measuring and metering devices and more specifically to a volumetric flow measuring and metering devices.

BACKGROUND OF THE INVENTION

There are many types of known flow metering and measuring devices and they include the following. Mass flow meters utilize temperature sensors that are placed upstream and downstream of a heating coil. The mass flow rate is inversely proportional to the temperature difference between the sensors. These flow meters are designed primarily for metering gas flow.

Turbine flow meters utilize a flowtube that contains a small propeller, or turbine, mounted co-axially. The angular speed of the tube is equivalent to flow rate. These flow meters produce an electrical output proportional to turbine speed.

In positive displacement flow meters, fluid enters the flow sensor chamber forcing a piston to move. Piston motion is proportional to flow rate and the flow meter produces an output signal based on the frequency of piston motion.

In vortex transmitter flow meters, flow passes baffles inside a transmitter, causing vortices to form. The frequency of the vortices is directly proportional to flow rate. Vortices cause pressure fluctuations which are sensed, amplified, and converted to an output signal.

Doppler flow meters utilize an ultrasonic beam that is transmitted at an angle into a fluid to be metered. Impurities in the fluid reflect the beam at a slightly different frequency to a receiving sensor. The Doppler shift value is proportional to flow velocity.

In magnetic flow meters, movement of a conductive fluid through a magnetic field generates a signal proportional to velocity. This technique utilizes the Faraday principle.

In differential pressure flow meters, a pressure difference is measured across an orifice. Flow is proportional to this pressure difference.

Though these flow meters have had a beneficial impact on flow metering, they are disadvantageous for one or more of the following reasons. They present an undesirable high back pressure to the sensed fluid. They are sensitive to particulates in the fluid or they require high particulate concentration for the fluid to be measured. Air bubbles can effect the accuracy of flow rate determination or can block flow. Many of these sensors measure flow indirectly by measuring the velocity and hence may provide undesirably inaccurate flow rates. The cost of some of the sensors used in these systems is undesirably high.

A need thus exists for a flow measuring and metering devices that has low susceptibility or sensitivity to particulate levels, does not produce back pressure and is accurate and inexpensive to produce and use, amongst other features.

SUMMARY OF THE INVENTION

Accordingly, it is an object of the present invention to provide a flow measuring and metering devices that has low susceptibility to substances or air bubbles in a flow being metered.

It is also an object of the present invention to provide a flow measuring and metering devices that does not produce a back pressure.

It is another object of the present invention to provide a flow measuring and metering devices that utilizes gravitational forces in metering flow rate.

It is another object of the present invention to provide a flow measuring and metering devices that is accurate in performance and economical to produce and operate.

These and related objects of the present invention are achieved by use of the volumetric flow measuring apparatus described herein.

The attainment of the foregoing and related advantages and features of the invention should be more readily apparent to those skilled in the art, after review of the following more detailed description of the invention taken together with the drawings.

DETAILED DESCRIPTION

Figure 1:
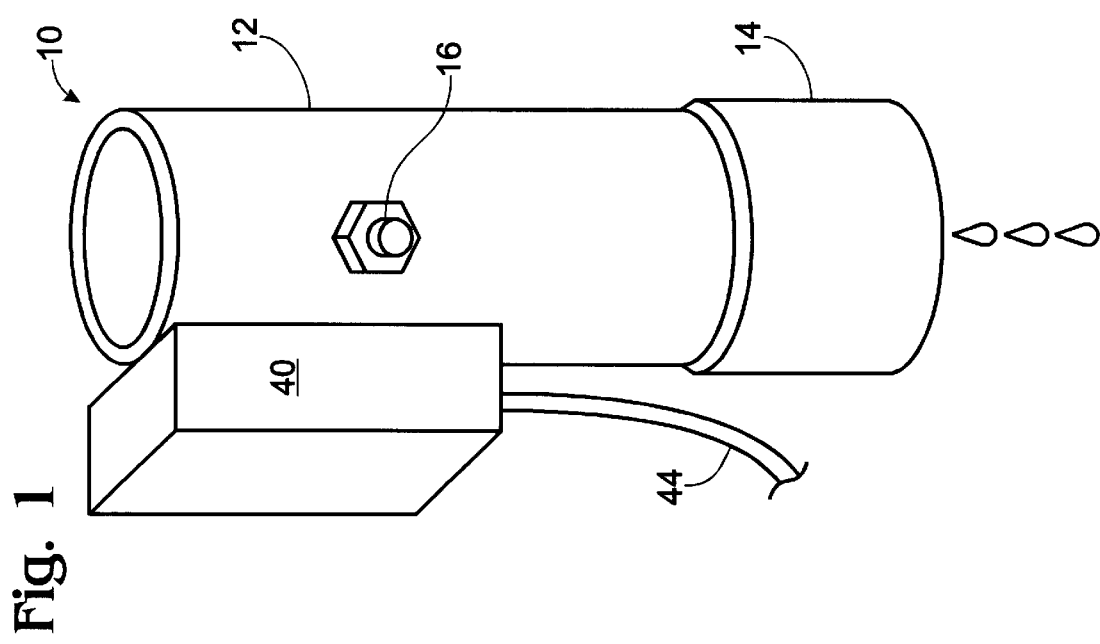
FIG. 1 is a perspective view of a volumetric flow measuring devices in accordance with the present invention.

Referring to FIG. 1, a perspective view of a volumetric flow measuring device 10 in accordance with the present invention is shown. Measuring device 10 preferably includes a cylindrical tube 12 to which is attached an end cap 14. An inlet adapter 16 is provided in a wall of tube 12. A housing 40 for an electronic control circuit is mounted to tube 12. Cable 44 supplies power to the electronic circuit and provides a path for the flow rate output signal. As will be described in more detail below liquid flows into inlet adapter 16 and fills a volume therebelow. Sensors are provided in this volume to determine the amount of time required for filling. When full, a plug in end cap 14 is withdrawn to permit liquid in the tube to flow out. The volume and rate of filling determine flow rate. Tube 12 and end cap 14 are preferably made of PVC and housing 40 is preferably a NEMA No. 4 enclosure.

Figure 2:
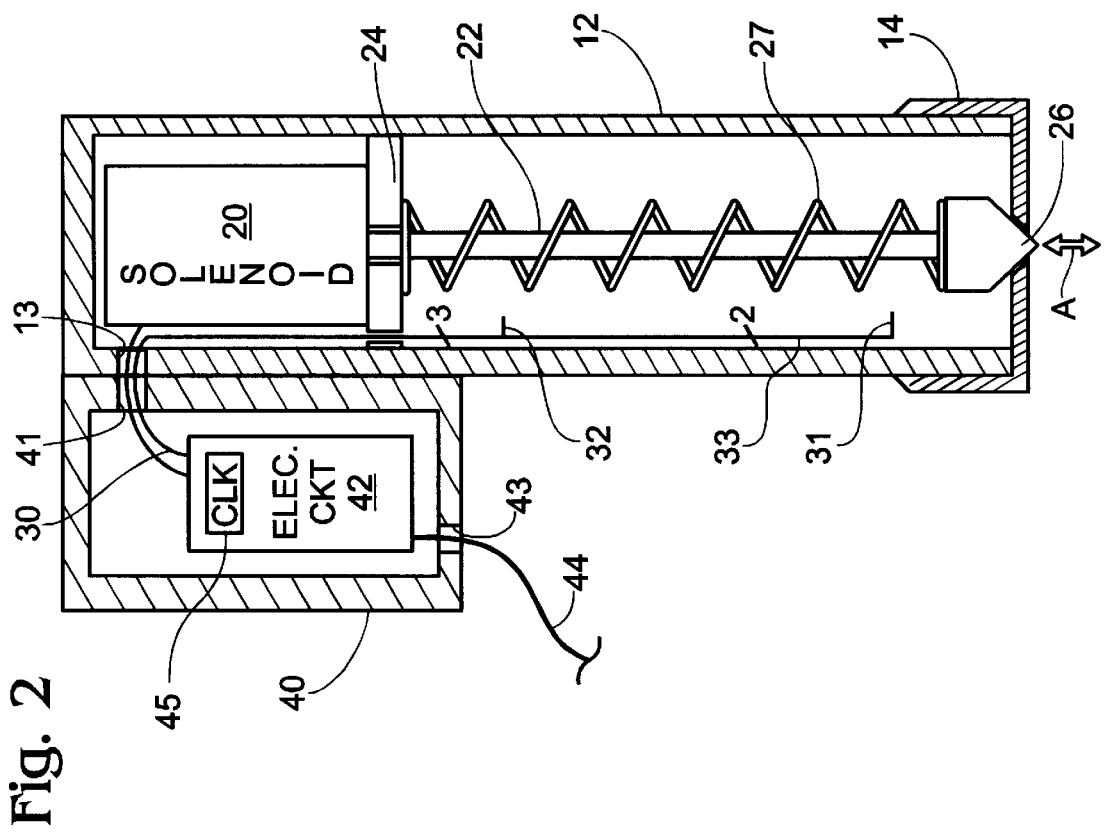
FIG. 2 is a partial cross-sectional view of the volumetric flow measuring device of FIG. 1 in accordance with the present invention.

Referring to FIG. 2, a partial cross-sectional view of measuring device 10 of FIG. 1 in accordance with the present invention is shown. Tube 12 houses a solenoid 20 from which extends a shaft 22. Plug 26 is affixed to the distal end of this shaft and moves in the direction indicated by Arrow A. Energizing solenoid 20 moves plug 26 from the opening. A coil spring 27 biases plug 26 towards a closed position and functions to close the opening when the solenoid is not energized. A support member 24 is fixedly connected to tube 12, for example by a screw, or other suitable fastening means. Support member 24 provides a first hole through which shaft 22 passes and a second hole through which sensor wires 30 pass. Support member 24 may alternatively be fashioned such that an individual hole for each sensor wire is provided. Solenoid 20 is steadfastly connected to support member 24, again by screws or other suitable fastening means.

Wire 30 includes sensor wires 31-33 which connect to the electronic circuit 42 and descend into tube 12. Wire 31 is the start count wire and extends downward to a defined start count level. Wire 32 is the stop count wire and extends downward to a defined stop count level. Wire 33 is positioned adjacent wires 31,32 and serves as a signal return therefor when a sufficient volume of water is present in the flow meter to support conduction. Accordingly, when water or another suitable liquid fills tube 12 to the level of start wire 31, a start count signal is propagated along wire 31 to the electronic circuit. When the water reaches the level of stop wire 32, a stop count signal is propagated along wire 32 to the electronic circuit.

Housing 40 is preferably mounted to tube 12 with PVC cement. Holes 13,41 are preferably sealed with silicon seal and hole 43 is sealed with a NEMA compression fitting (not shown) which is well known.

Wires 31–33 are preferably made of NiCr or like material because of its high level of resistance to corrosion. Holes 13 and 41 are respectively formed in tube 12 and housing 40 for the passage of wires 31–33 and solenoid activation wire 21 from tube 12 to electronic circuit 42. A clock circuit 45 within electronic circuit 42 calculates the time to fill the volume between sensor wires 31,32. Electronic circuit 42 also includes electronic flow rate calculting circuitry. Hole 43 is also provided in housing 40 for passage of wire 44.

Figure 3:
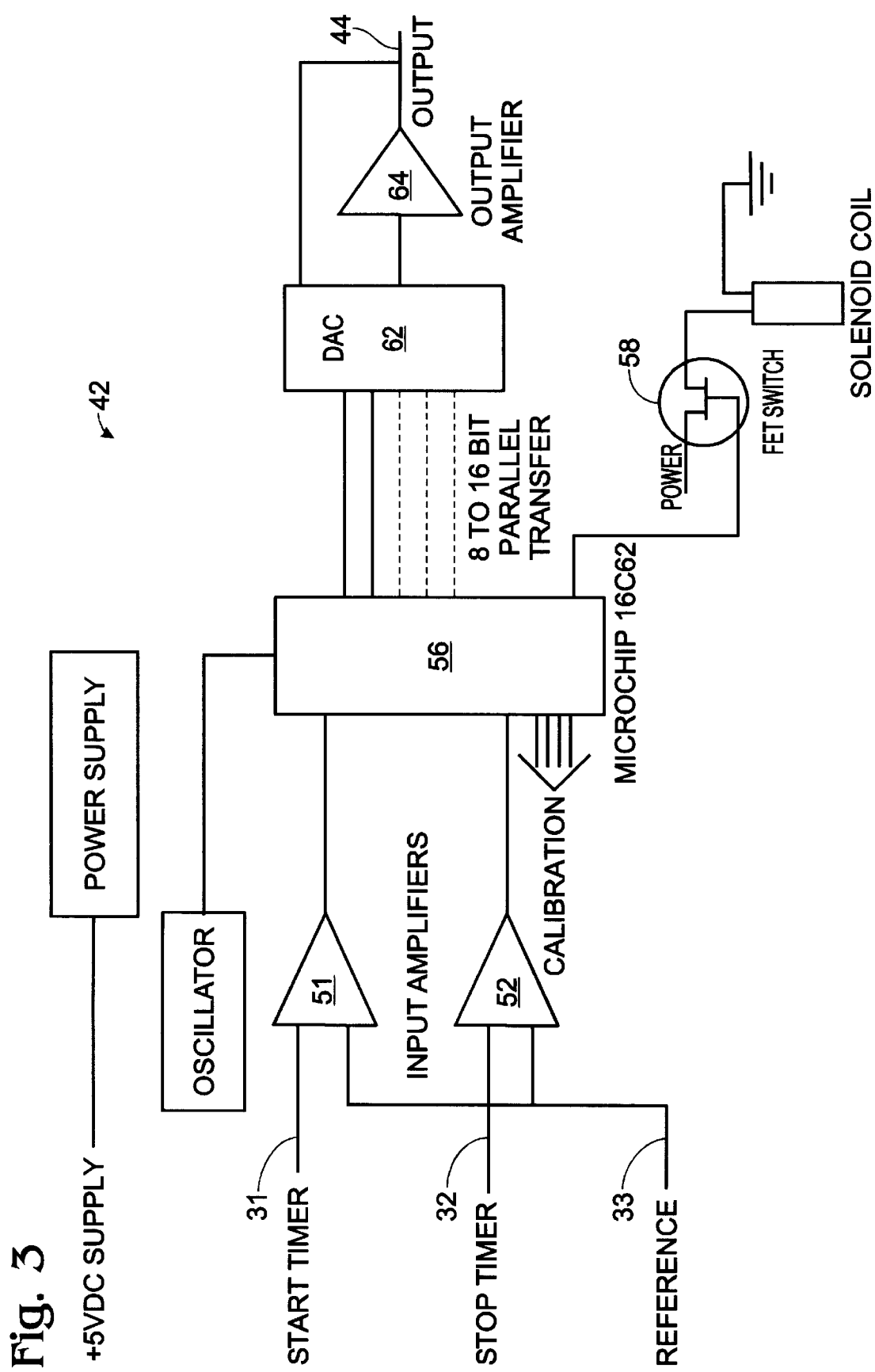
FIG. 3 is a block diagram of an embodiment of an electronic circuit for use in the flow measuring device of FIG. 1 in accordance with the present invention.

Referring to FIG. 3, a block diagram of an embodiment of electronic circuit 42 in accordance with the present invention is shown. Wire 31 feeds into input amplifier 51 and wire 32 feeds into input amplifier 52. Wire 33 provides a reference to these amplifiers and this amplifier arrangement effectively provides a threshold for determining whether liquid is present or not. The outputs of amplifiers 51,52 are input to an microprocessor such as the Model 16C52 of Microchip Corporation. A crystal oscillator 54 is also coupled to processor 56. The processor is programmed to calculate flow rate (FR) using the following equation:

$$FR=((52+\text{adj})/t)-1 \qquad (1)$$

where 52+adj is a constant selected during calibration and t is the time between start and stop signals propagated on wires 31,32. The calculated flow rate is output in a digital format to a digital to analog converter (DAC) 62 such as a Maxon MAX503. The analog representation of FR is output from DAC 62 to an output amplifier 64 which is provided with a stability feedback loop. From there the output signal may be propagated to a display, to scientific instrumentation used in connection with the flow meter, or to another destination. The 52+adj value is determined by adjusting the value of the processor calibration inputs such that a correct flow rate reading is output by circuit 42 for a known flow rate. The flow is essentially determined by measuring the time required to fill a defined volume.

Processor 56 also controls the activation of solenoid 20. In response to the stop signal, processor 56 enables a switch 58. When switch 58 is enabled, power is provided to solenoid 20 over line 21, causing the solenoid to retract shaft 22 and move plug 26 away from end cap 14. Switch 58 is energized an amount of time sufficient for the liquid accumulation in tube 12 to move through the force of gravity out the bottom end of tube 12. Flow meter 10 is designed to work with minimum and maximum flow rates. Minimum rates are discretionary and are determined by how long an operator is willing to wait for tube 12 to fill. The fill period can be programmed into processor 56 using known programming techniques. The maximum flow rate is determined by the volume and evacuation rate of tube 12. The incoming flow rate cannot exceed the evacuation rate for proper operation.

Figure 4:
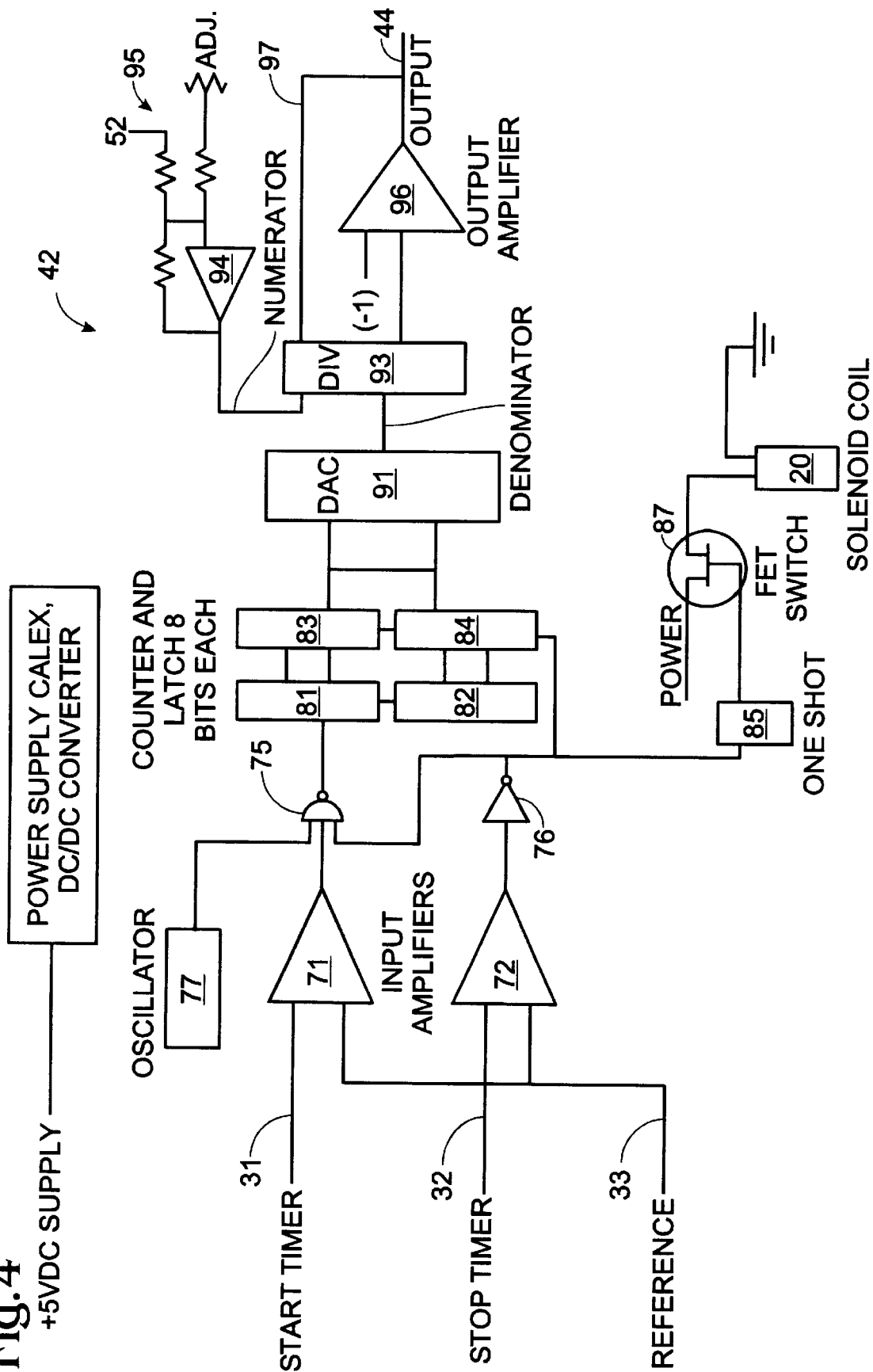
FIG. 4 is a block diagram of another embodiment of an electronic circuit for use in the flow measuring device of FIG. 1 in accordance with the present invention.

Referring to FIG. 4, a block diagram of another embodiment of electronic circuit 42 in accordance with the present invention is shown. Wires 31,32 feed into input amplifier 71,72 and wire 33 provides a reference. When the start count signal (wire 31) is active, an oscillator 77 output signal is gated through NAND gate 75 to count registers 81,82. The stop count signal is passed through inverter 76 to NAND 75 and disables the start count signal. The stop count signal is also propagated through a monostable multivibrator 85 to switch 87. When the switch is enabled, power is supplied to solenoid 20 causing shaft 22 to retract and plug 26 to be lifted.

The output of count registers 81,82 is latched by latches 83,84 and converted to analog by digital to analog converter (DAC) 91. The output of DAC 94 is provided to a divide module 93 which provides the reciprocal of the input, thus providing time, t, in the denominator of Eq'n (1). The numerator value of 52+adj is provided through R2R-ladder 95 and amplifier 94. The minus 1 value is added through output amplifier 96. A stability loop 97 is preferably provided internal or external to amplifier 96.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

What is claimed is:

1. A liquid flow measuring apparatus, comprising:

a liquid input and a liquid output;

a body provided between said input and said output and configured to define a volume;

a stopper for said liquid output that is moveable between an open and a closed position;

a start count sensor coupled to said body that detects when liquid filling said volume has reached a start level, said start count sensor producing a start count sensor output signal;

a stop count sensor coupled to said body that detects when liquid filling said volume has reached a stop level that is located above said start level, said atop count sensor producing a stop count sensor output signal;

a clock circuit coupled to said start and stop count sensors that calculates the time to fill a volume of said body between the start count and stop count levels;

an electronic flow rate calculating circuit coupled to said clock circuit that produces an electronic representation of flow rate through said body by dividing the volume of said body between the start and stop count levels by the calculated time to fill that body:

an output opening mechanism that moves said stopper to open said liquid output after said body has been filled to said stop count level to permit liquid to evacuate the body through said liquid output by force of gravity;

an output closing mechanism that moves said stopper to close said liquid output after said body has been evacuated of fluid below said start count level;

wherein the start count sensor output signal is used to start a count by said clock circuit of time to fill said volume; and wherein the stop count sensor output signal is used both in calculations of time to fill said volume and to remove the stopper from said liquid output.

2. The apparatus of claim 1, wherein said output opening mechanism includes an actuator that when active moves said stopper away from said liquid output and said output closing mechanism includes a bias mechanism that biases the stopper towards the liquid output such that when the actuator is not active the bias mechanism forces the stopper into position to block the liquid output.

3. The apparatus of claim 2, wherein said actuator includes a solenoid and said bias mechanism includes a spring biased in a manner substantially opposite of said solenoid.

4. The apparatus of claim 1, wherein at least one of said start and stop count sensors includes a supply conductive member and a return conductive member that form a closed circuit in the presence of a liquid.

5. The apparatus of claim 4, wherein said conductive members are made of a non-corrosive material.

6. The apparatus of claim 1, wherein said electronic flow rate calculating circuit includes logic that calculates a flow rate as approximately $((52+adj)/t)-1$, where $52+adj$ is a constant related to volume and $t$ is the fill time.

7. The apparatus of claim 6, further comprising a calibration mechanism for calibrating a value for $52+adj$.

8. A method for measuring liquid flow, comprising the steps of:

providing a body having a defined volume and a liquid input and a liquid output;

providing a stopper for said liquid output that is moveable between an open position and a closed position;

determining with a start count sensor when liquid has begun filling said volume at a first level thereof;

determining with a stop count sensor when liquid has filled said volume to a second level thereof that is above said first level;

removing the stopper from said liquid output when said stop count sensor indicates that said volume has been filled to said second level to permit liquid to evacuate the volume by force of gravity;

moving the stopper to close said liquid output after said start count sensor indicates that liquid in said volume has evacuated below said first level; and generating with a stopper control and flow rate calculation circuit a signal representative of a flow rate that is based on said defined volume and the amount of time required for a liquid to fill that volume as detected by the start count and stop count sensors;

wherein a start count sensor output signal generated by said start count sensor is used by said stopper control and flow rate calculation circuit to start a count of the amount of time required to fill said volume; and a stop count sensor output signal generated by said stop count sensor is used by said stopper control and flow rate calculation circuit both to end the count of amount of time required to fill said volume and to remove the stopper from said liquid output to permit evacuation.

* * * * *